United States Patent Office 2,789,021
Patented Apr. 16, 1957

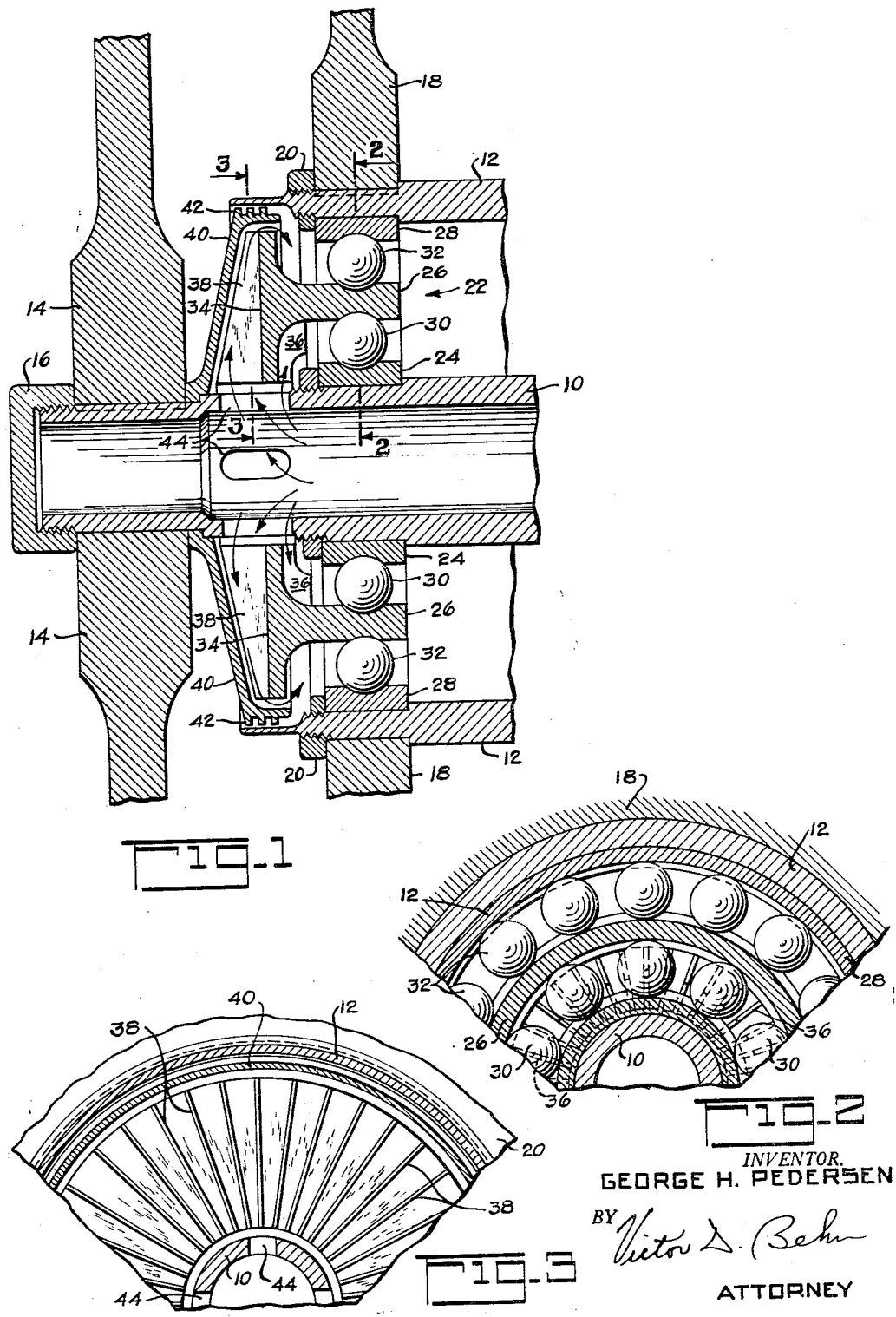

2,789,021

BEARING FOR CONTRA-ROTATING SHAFTS

George H. Pedersen, Pines Lake, N. J., assignor to Curtiss-Wright Corporation, a corporation of Delaware Application September 9, 1955, Serial No. 533,405

6 Claims. (Cl. 308—183)

This invention relates to bearings and is particularly directed to roller bearing construction for contra-rotating shafts.

The bearing design for concentric high speed oppositely rotating shafts is confronted by several problems. If the shafts are provided with independent bearings then the structural support for the inner shaft bearing is difficult and complicated. On the other hand if the inner shaft is supported within the outer shaft by a conventional bearing therebetween then the relative speed of rotation of the bearing races is very high and for high speed shafts becomes excessive, said relative speed being equal to the sum of the individual speeds of the oppositely rotating shafts.

An object of the invention comprises the provision of a novel and simple bearing construction for high speed contra-rotating shafts providing a satisfactory solution to the aforementioned problems in the design of such a bearing. A further object of the invention comprises the provision of a novel roller bearing designed to be mounted between a pair of oppositely rotating concentric shafts, said bearing having an intermediate bearing race in addition to inner and outer bearing races and means being provided to minimize rotation of the intermediate race. In accordance with the invention the intermediate bearing race is provided with impeller vanes, similar to those of a centrifugal type pump, whereby rotation of the intermediate race causes said impeller to function as a fluid pump thereby loading the impeller and retarding rotation of the intermediate bearing race, the fluid pumped by said vanes being used to lubricate and/or cool the bearing.

Other objects of the invention will become apparent upon reading the annexed detailed description in connection with the drawing in which:

Fig. 1 is an axial sectional view through bearing construction for contra-rotating shafts, said bearing construction embodying the invention; and Figs. 2 and 3 are sectional views taken along lines 2—2 and 3—3 of Fig. 1.

Referring to the drawing, a pair of shafts 10 and 12 are designed for rotation in opposite directions. The shafts 10 and 12 are hollow and the shaft 10 is concentrically mounted within the shaft 12. The shafts 10 and 12 may comprise the shafts of a pair of oppositely rotating turbine or compressor rotors of a two spool contra-rotating turbo-jet engine and the invention is described in connection with such an application. As will appear, however, the invention is of general application to contra-rotating concentric shafts.

The inner shaft 10 extends beyond the outer shaft 12 and a turbine or compressor rotor disc 14 is secured thereto for example by a nut 16 threaded on said shaft. A similar rotor disc 18 is secured to the outer shaft 12 as by a nut 20 threaded on said shaft 12. The inner shaft 10 is supported within the outer shaft by a bearing construction indicated generally by reference numeral 22.

The bearing construction 22 comprises an inner bearing race 24 secured to the inner shaft 10, an intermediate bearing race 26 and an outer bearing race 28 secured to the other shaft 12. A first set of bearing rollers 30 are disposed between and in rolling engagement with the bearing races 24 and 26 and a second set of bearing rollers 32 are disposed between and in rolling engagement with the bearing races 26 and 28. As used herein a bearing "roller" is intended to cover the various types of balls and rollers used in roller and/or ball bearings.

The bearing 22 supports the shaft 10 within the shaft 12. The intermediate bearing race 26 is not drivably connected to either of the shafts 10 or 12. The intermediate race, however, is subjected to a turning torque resulting from the forces of friction between the rollers 30 and 32 and said race. In general, the turning torque on the intermediate bearing race 26 resulting from the frictional forces exerted by the rollers 30 thereon will not balance the corresponding but opposite turning torque resulting from the frictional forces exerted by the rollers 32 on said race. Hence, the intermediate bearing race generally will have an unbalanced torque in one direction or the other and, in the absence of complete restraint, will run in the direction of said unbalanced torque.

In accordance with the invention the intermediate bearing race 26 is provided with impeller vanes, similar to those of a centrifugal pump, whereby when said bearing race 26 rotates its said vanes function as a fluid pump thereby imposing a restraining load on said race.

For this purpose a transverse annular plate 34 is secured or formed across an end of the intermediate bearing race 26, said plate being disposed between the shafts 10 and 12 and extending both radially outwardly and radially inwardly of the portion of the intermediate bearing race engaged by the rollers 30 and 32. A plurality of circumferentially-spaced vanes 36 extend radially and are secured to the radially inwardly extending portion of the plate 34 on the side facing the bearing. A second plurality of circumferentially-spaced vanes 38 extend radially across and are secured to the plate 34 on the side remote from the bearing. In addition an annular shroud member 40 is secured to the inner shaft 10, said shroud member 40 extending across the outer edges of the vanes 38, the radially outer end of said shroud being spaced radially outwardly of the radially outer ends of the vanes 38 and extending into sealing relation with the outer shaft 12 as indicated at 42. A suitable fluid, such as lubricating oil, is supplied through the hollow shaft 10 and openings 44 in said shaft, said openings being adjacent to the radially inner ends of the vanes 36 and 38.

With the aforedescribed construction, upon rotation of the intermediate bearing race 26, the vanes 36 function as a pump to pump a fluid lubricant to the rollers 30 and the bearing race surfaces engaged thereby. Likewise the vanes 38 function as a pump to pump fluid lubricant to the rollers 32 and the bearing race surfaces engaged thereby. Thus the vanes 36 and 38 impose a pumping load on the intermediate bearing race which restrains rotation of said race regardless of its direction of rotation. The vanes 36 and 38 preferably are flat so that they are equally effective in either direction of rotation of the intermediate race 26.

In the absence of the restraining load provided by the vanes 36 and 38 the intermediate race might run at a high speed for example at the speed of either of the shafts 10 and 12. Said restraining load, however, minimizes the rotatve speed of the intermediate bearing race thereby reducing or minimizing the maximum speed of said race 26 relative to the bearing races 24 and 28. Thus, as previously stated, if a conventional two race bearing were disposed between the shafts 10 and 12 the relative speed of the bearing races would be equal to the sum of the shaft speeds. With the bearing 22, however, the speed of the intermediate bearing race 26 relative to one of the shaft bearing races is equal to the sum of the speed of said shaft and the speed of the intermediate bearing race while the speed of said intermediate bearing race relative to the other shaft bearing race is equal to the difference of the speed of this latter shaft and that of the intermediate bearing race. The speed of the intermediate bearing race however is low compared to that of the shafts so that with the present invention the maximum speed of the intermeditae bearing race relative to the other bearing races is not much greater than the maximum shaft speed.

Preferably, the fluid pumped by the vanes 36 and 38 is directed over the sets of bearing rollers 32 and 34 and the bearing surfaces engaged thereby. Thus the radially outer surface of the shroud 40 is curved as illustrated to help direct the fluid pumped by the vanes 38 toward the outer set of bearing rollers 34 and the surface of the plate 34 from which the vanes 36 project is curved to direct the fluid pumped by said vanes 36 toward the bearing rollers 32. With this arrangement, when the fluid pumped by the impeller vanes 36 and 38 is an oil, said fluid both lubricates and cools the bearing surfaces. The lubricating oil may even be in the form of a mist. In fact simply having the vanes 36 and 38 pump air will substantially retard the rotative speed of the intermediate bearing race particularly if the turning moment on said intermediate race is low.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In combination with a pair of inner and outer concentric shafts rotatable in opposite directions; bearing means disposed between said shafts; said bearing means comprising concentric inner and outer annular bearing members secured to said inner and outer shafts respectively, an intermediate annular bearing member disposed between and rotatable independently of said inner and outer bearing members, and a plurality of radially-extending vanes secured to said intermediate member, said vanes being circumferentially-spaced about the bearing axis such that upon rotation of said intermediate member said vanes function as a fluid pump.

2. In combination with a pair of inner and outer concentric shafts rotatable in opposite directions; bearing means disposed between said shafts; said bearing means comprising concentric inner and outer bearing races secured to said inner and outer shafts respectively, an intermediate annular bearing race disposed between and rotatable independently of said inner and outer bearing races a first set of bearing rollers disposed between and in rolling engagement with said outer and intermediate bearing races, a second set of bearing rollers disposed between and in rolling engagement with said intermediate and inner bearing races, and a plurality of radially-extending vanes secured to said intermediate member, said vanes being circumferentially-spaced about the bearing axis such that upon rotation of said intermediate member said vanes function as a fluid pump.

3. The combination recited in claim 2 in which means are provided to direct the fluid pumped by said vanes to at least one of said sets of rollers.

4. In combination with a pair of inner and outer concentric shafts rotatable in opposite directions; bearing means disposed between said shafts; said bearing means comprising concentric inner and outer annular bearing races secured to said inner and outer shafts respectively, an intermediate annular bearing race disposed between and rotatable independently of said inner and outer bearing races, a first set of bearing rollers disposed between and in rolling engagement with said outer and intermediate bearing races, a second set of bearing rollers disposed between and in rolling engagement wtih said intermediate and inner bearing races, first and second sets of radially extending vanes secured to said intermediate race member, the vanes of each set being circumferentially-spaced about the bearing axis and being arranged so that upon rotation of said intermediate member the first set of vanes functions to pump lubricating oil between said outer and intermediate bearing races and the second set of vanes functions to pump lubricating oil between said intermediate and inner bearing races.

5. In combination with a pair of inner and outer concentric shafts rotatable in opposite directions; bearing means disposed between said shafts; said bearing means comprising concentric inner and outer annular bearing members secured to said inner and outer shafts respectively, an intermediate annular bearing member disposed between and rotatable independently of said inner and outer bearing members, and means connected to said intermediate bearing member for operation as a fluid pump upon rotation of said intermediate member.

6. In combination with a pair of inner and outer concentric shafts rotatable in opposite directions; bearing means disposed between said shafts; said bearing means comprising concentric inner and outer annular bearing races secured to said inner and outer shafts respectively, an intermediate annular bearing race disposed between said inner and outer bearing races, a first set of bearing rollers disposed between and in rolling engagement with said outer and intermediate bearing races, a second set of bearing rollers disposed between and in rolling engagement with said interemdiate and inner bearing races and fluid pump means connected to said intermediate bearing race and effective upon rotation of said intermediate race to pump a coolant in heat exchange relation with said bearing rollers and the bearing races.

References Cited in the file of this patent

UNITED STATES PATENTS

| 2,318,990 | Doran | May 1, 1943 |

FOREIGN PATENTS

| 647,002 | Great Britain | Dec. 6, 1950 |
| 842,382 | France | Mar. 6, 1939 |